Sept. 19, 1950  G. ZEIGLER  2,522,916
WHEEL ALIGNING GAUGE
Filed Feb. 8, 1947  2 Sheets-Sheet 1
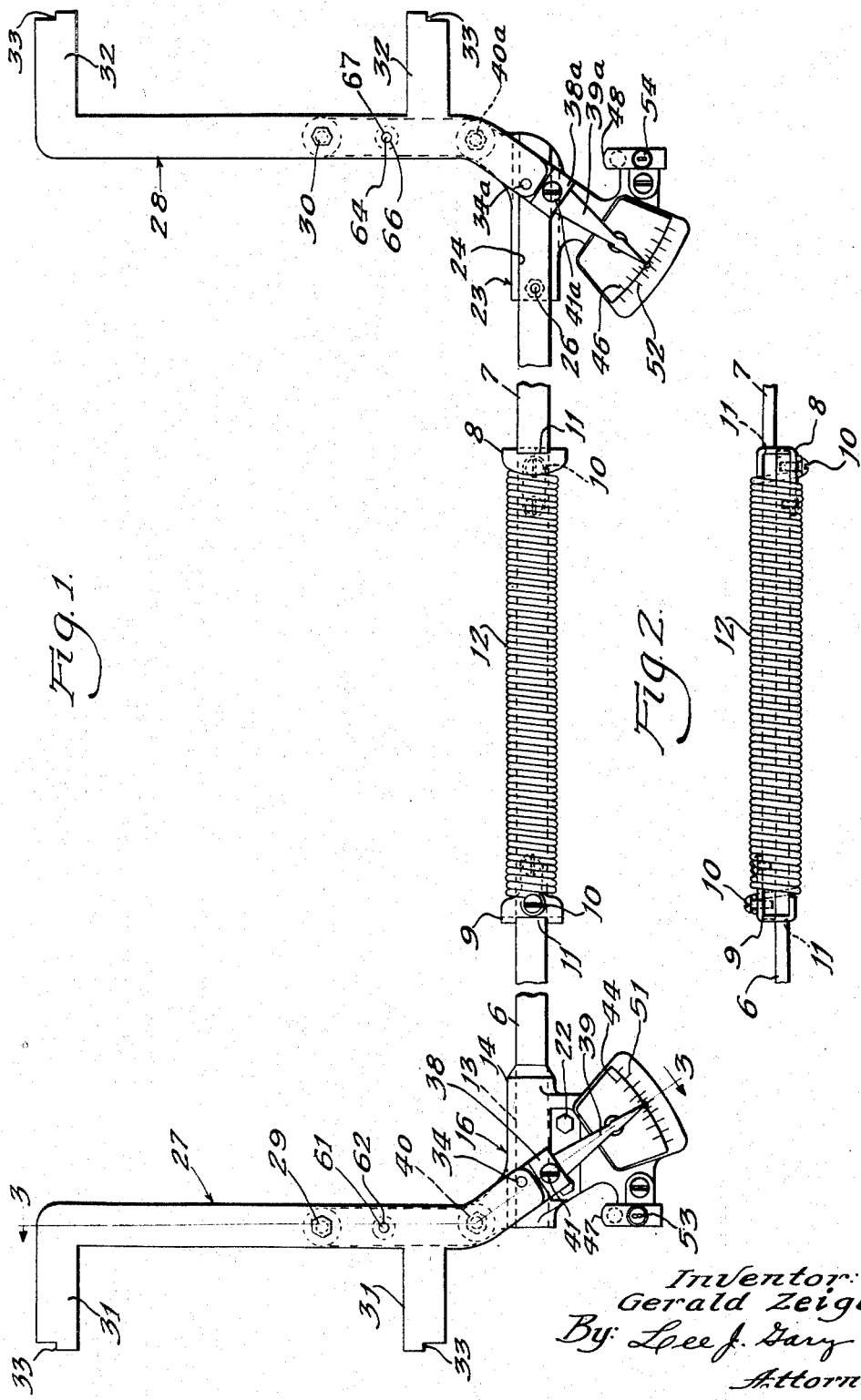
Inventor:
Gerald Zeigler
By: Lee J. Gary
Attorney

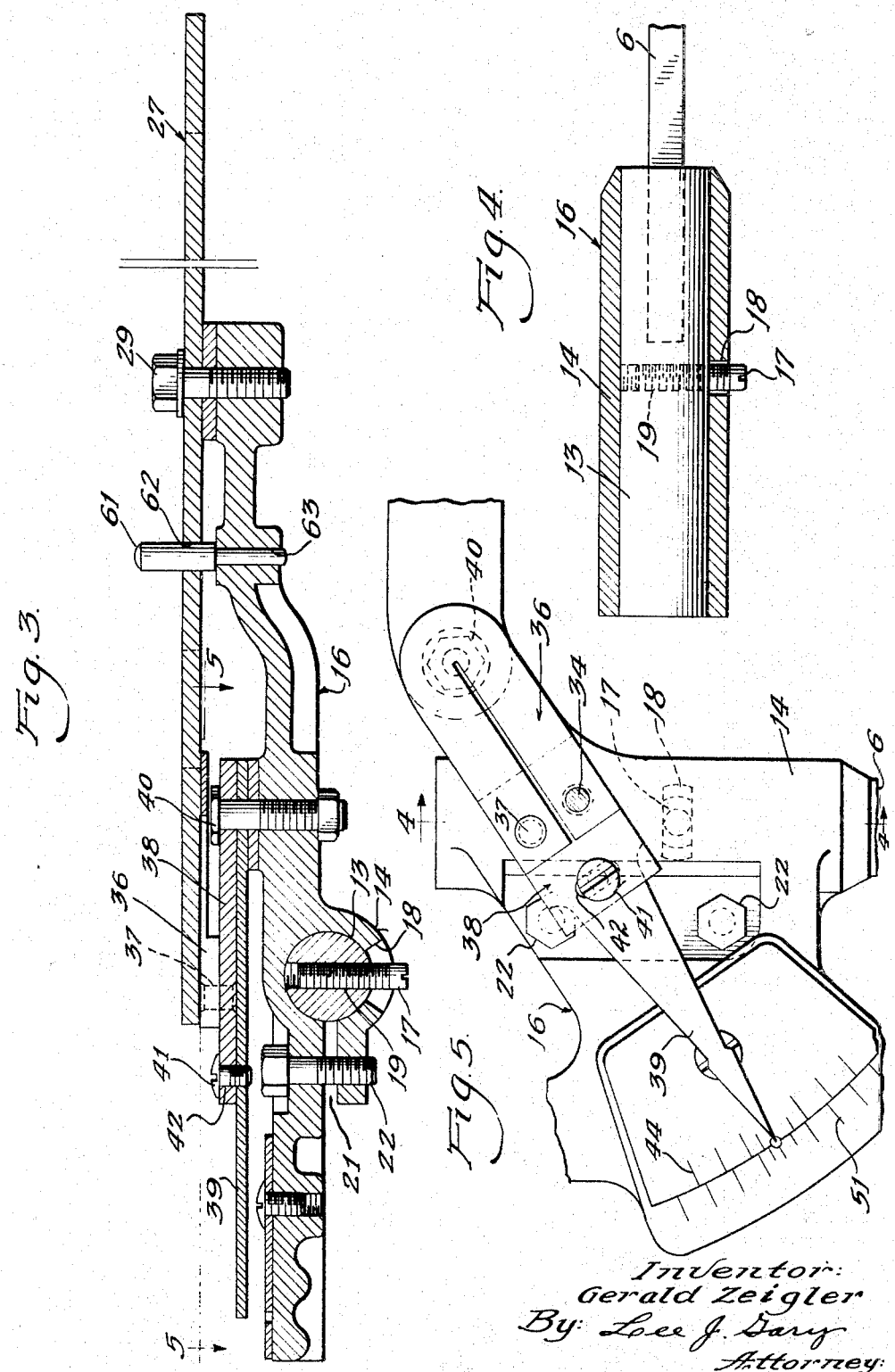

Patented Sept. 19, 1950

2,522,916

UNITED STATES PATENT OFFICE 2,522,916

WHEEL ALIGNING GAUGE

Gerald Zeigler, Denver, Colo., assignor to Bear Manufacturing Company, Rock Island, Ill., a corporation of Delaware Application February 8, 1947, Serial No. 727,437

7 Claims. (Cl. 33—203.2)

This invention relates to improvements in wheel aligning gauges and is more particularly concerned with the provision of a gauge adapted for use in measuring the camber of the front wheels of automobiles. This invention also contemplates the provision of a wheel aligning gauge which may also be employed for measuring the toe-in of the front wheels of automobiles.

Briefly, this invention comprises a wheel aligning gauge which is similar to the type of gauge disclosed in Letters Patent 2,256,968 granted September 23, 1941, and comprising a pair of cross bars telescopically engaged at their inner ends and having pivot brackets secured to their outer ends. Each pivot bracket supports a pivotally mounted abutment bar provided for engagement against the rim or felloe of a wheel, and suitable connecting links actuated by each abutment bar for moving a pointer relative to a pair of calibrated scales, one scale being graduated with degrees to indicate camber and the other scale being graduated in inches to indicate toe-in. In measuring the camber of a wheel, the abutment bars are disposed in a vertical plane with their ends in engagement with the front side of the wheel rims. In measuring front wheel toe-in, the abutment bars are positioned in a horizontal plane with their ends in engagement against the felloe or rim of the wheels.

In taking camber or toe-in measurements by means of the type of the wheel aligning gauge disclosed in Patent 2,256,968, it has been found difficult to adjust an abutment bar at one end of the gauge without causing the abutment bar at the opposite end to be displaced from its engagement with the wheel. It is, therefore, an object of the present invention to provide a wheel aligning gauge in which one of the abutment bar pivot brackets is journaled for a limited rotational movement upon the outer end of its respective cross bar to thus permit limited angular adjustment of either abutment bar without causing displacement of the opposite abutment bar from its engagement with a wheel.

It is a further object of this invention to provide a wheel aligning gauge with means to facilitate the adjustment of each pointer with respect to its graduated scale.

It is a further object of this invention to provide a wheel aligning gauge which is relatively simple in construction and inexpensive to manufacture, reliable in use and which will not readily get out of order.

This invention embodies other novel features, details of construction and arrangement of parts which are hereinafter set forth in the specification and claims and illustrated in the accompanying drawings wherein:

Fig. 1 is a plan view showing a wheel aligning gauge embodying features of this invention.

Fig. 2 is a fragmentary detail front elevational view showing the means employed for connecting the inner ends of the cross bars.

Fig. 3 is a sectional view taken along the line 3—3 of Fig. 1.

Fig. 4 is a sectional view taken along the line 4—4 of Fig. 5.

Fig. 5 is a sectional view taken along the line 5—5 of Fig. 3.

Referring now to the drawings for a better understanding of this invention, the wheel aligning gauge is shown as comprising a pair of cross bars 6 and 7 having their inner ends secured in overlapping relation by means of guide clips 8 and 9. The guide clips are preferably formed of sheet metal and secured to the ends of their respective cross bars by means of screws 10. Each clip is also provided with an aperture 11 to receive and hold the cross bars 6 and 7 in parallel alignment and to permit relative axial movement of the cross bars. A helical spring 12 is provided to enclose the overlapping ends of the cross bars 6 and 7, one end of the spring being attached to the guide clip 8 and the other end of the spring being secured to the guide clip 9. The spring 12 thus acts to yieldably resist relative inward movement of the cross bars 6 and 7.

The outer end of the cross bar 6 is provided with a journal 13 to receive a bearing portion 14 of a pivot bracket 16. After the pivot bracket 16 is mounted on the journal 13, a set screw or threaded stud 17 is inserted through a slotted aperture 18 in the bearing 14 for engagement in a threaded aperture 19 provided in the journal 13. The threaded stud 17 thus acts to permit limited rotational movement of the pivot bracket 16 relative to the cross arm 6, and also serves to hold the pivot bracket against axial movement relative to the cross arm 6. The bearing 14 of the pivot bracket 16 is preferably split longitudinally at 21 to permit limited adjustment of the bearing diameter by means of the cap screws 22.

A fixed bracket 23 is provided with a groove 24 to receive the outer end of the cross bar 7. The bracket 23 and cross bar 7 are secured together by means of a pair of cap screws 26 which project through apertures provided in bracket 23 for threaded engagement in the cross bar 7.

Abutment bars 27 and 28 are pivotally mounted upon the brackets 16 and 23, respectively, by means of shoulder screws 29 and 30, respectively. The abutment bars 27 and 28 are each provided with a pair of wheel engaging arms 31 and 32, respectively, which extend laterally an equal distance from the longitudinal axes of bars 27 and 28. The ends of the wheel engaging arms 31 and 32 are formed with shoulders 33 for engagement against an internal surface of a wheel rim.

The inner end of the abutment bar 27 is pivotally connected at 34 to a pivot link 36 which, in turn, is pivotally connected at 37 to an adjustment bar 38. The adjustment bar 38 and a pointer 39 are disposed in superimposed relation for joint pivotal movement on a bolt 40 provided on the pivot bracket 16. The pointer 39 is adapted to be adjusted relative to the adjustment bar 38 by means of an adjustment screw 41 which passes through a slot 42 provided in the adjustment bar for threaded engagement in the pointer 39. By means of the adjustment screw 41, it will be noted that the pointer 39 may be pivotally adjusted relative to the adjustment bar 38. The abutment bar 28 acts through a pivot link similar to pivot link 36 and through adjustment bar 38a to actuate a pointer 39a, which parts are the same in construction and operation as those heretofore described in connection with the abutment bar 27.

Camber scales 44 and 46, calibrated in degrees, are provided on the brackets 16 and 23, respectively, for use with their respective pointers 39 and 39a for indicating the camber of the front wheels of an automobile when the abutment bars 27 and 28 are disposed in a vertical plane with the outer ends of the arms 31 and 32 in engagement with their respective wheels. The abutment bars are accurately positioned in a vertical plane by means of spirit levels 47 and 48 mounted on brackets 16 and 23, respectively. It is an important feature of the present invention to provide a wheel aligning device in which the abutment bars 27 and 28 may be vertically or horizontally adjusted against the rim of a wheel independently of and without affecting the position of the opposite abutment bar. This is accomplished by providing a pivot bracket 16 with a bearing for limited rotational movement relative to the cross bar 6. During the use of the wheel aligning device, it will be noted that the abutment bars 27 and 28 may first be positioned against their respective wheel rims; after which, each abutment bar may be accurately positioned without causing the opposite abutment bar to be displaced.

Toe-in scales 51 and 52, calibrated in inches, are provided on the brackets 16 and 23, respectively, for indicating the toe-in of a pair of front wheels of an automobile when the abutment bars 27 and 28 are disposed in a horizontal plane with their respective wheel engaging arms 31 and 32 in engagement with the rims of their respective wheels. The abutment bars 27 and 28 are accurately positioned in a horizontal plane by means of spirit levels 53 and 54 provided on brackets 16 and 23, respectively.

During assembly of the wheel aligning gauge, it is necessary to position the outer ends of the arms 31 in parallel spaced relation with the outer ends of the arms 32. This is accomplished by inserting a locking pin 61 in aligning apertures 62 and 63 formed in the abutment bar 27 and bracket 16, respectively; and by inserting a locking pin 64 in aligning apertures 66 and 67 formed in the abutment bar 28 and bracket 23, respectively. After the abutment bars 27 and 28 have been locked against pivotal movement relative to their respective brackets 16 and 23, the pointers 39 and 39a are brought into alignment with the zero marking provided on their respective scales. The adjustment screws 41 and 41a are then tightened to secure their respective pointers to their respective adjustment bars 38 and 38a. When the abutment bars 27 and 28 are thus accurately set with respect to each other with their respective pointers 39 and 39a in registry with the zero markings on their respective dials, the locking pins 61 and 64 are removed to permit pivotal movement of the abutment bars 27 and 28 relative to their brackets 16 and 23.

While this invention has been shown in but one form, it is obvious to those skilled in the art that it is not so limited but is susceptible of various changes and modifications without departing from the spirit and scope of the claimed invention.

I claim as my invention:

1. In a wheel aligning gauge, a pair of cross bars having their inner ends engaged for relative axial movement, resilient means to yieldably resist relative axial movement of said cross bars in one direction, a fixed bracket secured on the outer end of one of said cross bars, a pivot bracket journaled on the outer end of the other of said cross bars for limited rotational movement about the longitudinal axis of the bar upon which it is mounted, and an abutment bar pivotally mounted on each of said brackets for engagement against the inner sides of a pair of wheels to be aligned.

2. In a wheel aligning gauge, a pair of cross bars having their inner ends engaged for relative axial movement, resilient means to yieldably resist relative axial movement of said cross bars in one direction, a fixed bracket secured on the outer end of one of said cross bars, a pivot bracket journaled on the outer end of the other of said cross bars for rotational movement about the longitudinal axes of said cross bars, an abutment bar pivotally mounted on each of said brackets for engagement against the inner sides of a pair of wheels to be aligned, and measurement indicator means provided on each of said brackets for movement responsive to pivotal movement of said abutment bars.

3. In a wheel aligning gauge, a pair of cross bars having their inner ends engaged for relative axial movement, resilient means to yieldably resist relative axial movement of said cross bars in one direction, a fixed bracket secured on the outer end of one of said cross bars, a pivot bracket journaled on the outer end of the other of said cross bars for rotational movement about the longitudinal axes of said cross bars, an abutment bar pivotally mounted on each of said brackets for engagement against the inner sides of a pair of wheels to be aligned, measurement indicator means provided on each of said brackets for movement responsive to pivotal movement of said abutment bars, locking means to secure said abutment bars in fixed predetermined position relative to their respective brackets, and adjustment means to set the indicator means at a selected reading while the abutment bars are secured in fixed position.

4. In a wheel aligning gauge, a pair of cross bars having their inner ends engaged for relative axial movement, resilient means to yieldably resist relative axial movement of said cross bars in one direction, a fixed bracket secured on the outer end of one of said cross bars, a pivot bracket journaled on the outer end of the other of said cross bars for rotational movement about the longitudinal axes of said cross bars, an abutment bar pivotally mounted on each of said brackets for engagement against the inner sides of a pair of wheels to be aligned, a pointer pivotally mounted on each of said brackets, an adjustment bar pivotally mounted on each of said brackets for common pivotal movement with its respective pointer, a pivot link pivotally connected at one point to its respective abutment bar and at another point to its respective adjustment bar, and a graduated scale provided on each of said brackets.

5. In a wheel aligning gauge, a pair of cross bars having their inner ends engaged for relative axial movement, resilient means to yieldably resist relative axial movement of said cross bars in one direction, a fixed bracket secured on the outer end of one of said cross bars, a pivot bracket journaled on the outer end of the other of said cross bars for rotational movement about the longitudinal axes of said cross bars, an abutment bar pivotally mounted on each of said brackets for engagement against the inner sides of a pair of wheels to be aligned, a pointer pivotally mounted on each of said brackets, an adjustment bar pivotally mounted on each of said brackets for common pivotal movement with its respective pointer, a pivot link pivotally connected at one point to its respective abutment bar and at another point to its respective adjustment bar, a graduated scale provided on each of said brackets, and means to pivotally adjust each pointer relative to its respective adjustment bar.

6. In a wheel aligning gauge, a pair of cross bars having their inner ends engaged for relative axial movement, resilient means to yieldably resist relative axial movement of said cross bars in one direction, a fixed bracket secured on the outer end of one of said cross bars, a pivot bracket journaled on the outer end of the other of said cross bars for rotational movement about the longitudinal axes of said cross bars, an abutment bar pivotally mounted on each of said brackets for engagement against the inner sides of a pair of wheels to be aligned, a pointer pivotally mounted on each of said brackets, and adjustment bar pivotally mounted on each of said brackets for common pivotal movement with its respective pointer, a pivot link pivotally connected at one point to its respective abutment bar and at another point to its respective adjustment bar, a graduated scale provided on each of said brackets, and means to pivotally adjust each pointer relative to its respective adjustment bar, and locking means to secure said abutment bars in fixed predetermined position relative to their respective brackets during pivotal adjustment of said pointers relative to their respective adjustment bars.

7. In a wheel aligning gauge, a pair of cross bars having their inner ends engaged for relative axial movement, resilient means to yieldably resist relative axial movement of said cross bars in one direction, a fixed bracket secured on the outer end of one of said cross bars, a pivot bracket journaled on the outer end of the other of said cross bars for rotational movement about the longitudinal axes of said cross bars, an abutment bar pivotally mounted on each of said brackets for engagement against the inner sides of a pair of wheels to be aligned, a pointer pivotally mounted on each of said brackets, an adjustment bar pivotally mounted on each of said brackets for common pivotal movement with its respective pointer, a pivot link pivotally connected at one point to its respective abutment bar and at another point to its respective adjustment bar, a graduated scale provided on each of said brackets, screw means to pivotally adjust each pointer relative to its respective adjustment bar, and locking pin means to secure said abutment bars in fixed predetermined position relative to their respective brackets during pivotal adjustment of said pointers relative to their respective adjustment bars.

GERALD ZEIGLER.

REFERENCES CITED

The following references are of record in the file of this patent:

UNITED STATES PATENTS

| Number | Name | Date |
| --- | --- | --- |
| 747,824 | Wilt | Dec. 22, 1903 |
| 1,987,098 | Creagmile | Jan. 8, 1935 |
| 2,256,968 | Wochner | Sept. 23, 1941 |

FOREIGN PATENTS

| Number | Country | Date |
| --- | --- | --- |
| 283,277 | Great Britain | Jan. 9, 1928 |
| 504,756 | Great Britain | May 1, 1939 |